March 16, 1948.  K. C. EDWARDS ET AL  2,438,003
CLOSURE
Filed Sept. 13, 1945
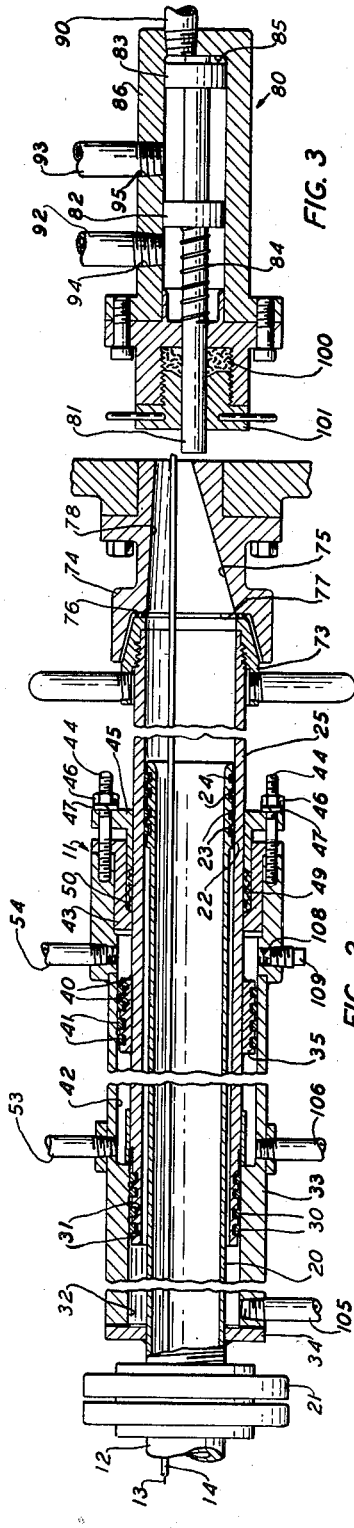
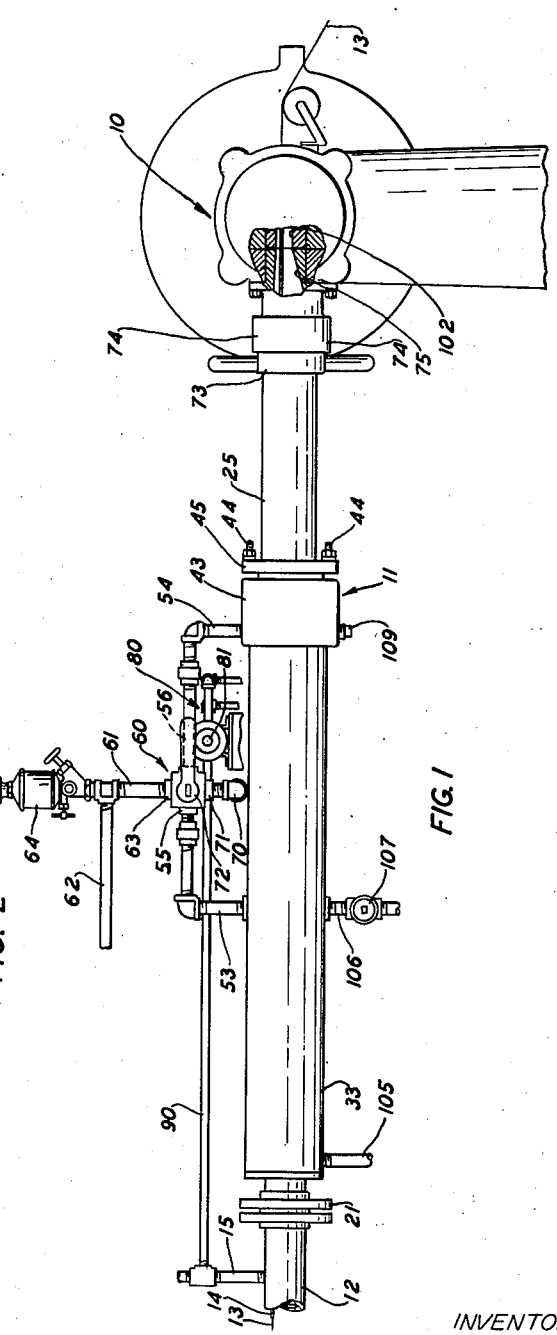
INVENTORS
K.C. EDWARDS
D.D. JONES
BY
ATTORNEY Patented Mar. 16, 1948

2,438,003

UNITED STATES PATENT OFFICE 2,438,003

CLOSURE

Karl C. Edwards, Chase, and David D. Jones, Towson, Md., assignors to Western Electric Company, Incorporated, New York, N. Y., a corporation of New York Application September 13, 1945, Serial No. 616,012

4 Claims. (Cl. 18—6)

This invention relates to closures, and more particularly to closures for high pressure fluid chambers.

In the operation of continuous extrusion and vulcanization apparatus of a type having an extruder for extruding a continuous cover over a continuous core and a tubular vulcanizer placed in tandem with the extruder, it is often necessary to open the vulcanizer for purposes of inspecting the continuous cover, or for the purpose of splicing the core. To open the vulcanizer it is necessary to stop the operation thereof and that of the extruder. Hence, it is desirable to have an opening which facilitates such inspection or splicing, to have a closure for the opening and to have means for opening and closing the closure as quickly as possible so that the extrusion and vulcanization is interrupted for as short a time as possible.

An object of this invention is to provide new and improved closures.

A further object of this invention is to provide closures for vulcanizers which may be opened and closed almost instantaneously.

In accordance with these objects, in one embodiment of the invention there is provided reciprocable means movable across an opening in a fluid containing chamber for exposing and closing the opening. Power-operated means move the reciprocable means to expose and close the opening.

In accordance with one embodiment of the invention, a bare conductor is advanced through a passage in an extruding head, wherein a covering of a suitable vulcanizable compound is applied on the conductor. The covered conductor is advanced seriatim from the extruding head through an adapter, a sleeve having an annular piston formed on one end thereof mounted slidably between a guide tube and a cylinder, and thence through a guide tube and a vulcanizing tube. Pipes lead from opposite ends of the cylinder to a four-way valve which is connected to a source of air under pressure and to an exhaust. When the valve is actuated in one manner, air under pressure is supplied to one end of the cylinder and the air from the other end thereof is exhausted so that the piston and the sleeve are urged in one direction to close an opening between the cylinder and the adapter. When the valve is reversed, air under pressure moves the sleeve away from the adapter to expose the conductor. The axis of the passage in the extrusion head is offset upwardly from the axes of the sleeve and the vulcanizing tube so that clearance in the sleeve and the vulcanizing tube are provided for sag in the conductor and the covering extruded thereon so that the covering is not scuffed in the vulcanizing tube. Thus, contact between the freshly extruded covering and the sleeve or the vulcanizing tube is avoided along with possible damage to the covering resulting from such contact.

A complete understanding of the invention may be obtained from the following detailed description of an apparatus forming a specific embodiment thereof, when read in conjunction with the appended drawing, in which:

Fig. 1 is a fragmentary, front elevation of an apparatus embodying the invention;

Fig. 2 is an enlarged, fragmentary elevation of the apparatus shown in partial section, and Fig. 3 is a horizontal section of a portion of the apparatus.

Referring now in detail to the drawing, an extruder 9 of known design having an extrusion head 10 is connected by a connector 11 to a vulcanizer tube 12 of a type known to the art. A bare conductor 13 is advanced continuously through the extrusion head to the left, as viewed in Fig. 1, by suitable means (not shown), such as a capstan. A covering 14 of a suitable vulcanizable insulating or jacketing compound is extruded over the conductor by the extrusion head, and the covered conductor is advanced seriatim through the splice box and the vulcanizing tube. Steam under high pressure is supplied to the vulcanizing tube by a steam pipe 15, and the steam vulcanizes the covering on the conductor as the covered conductor is advanced through the vulcanizing tube.

A guide tube 20 (Fig. 2) is connected by a coupling 21 to the vulcanizing tube 12, and has an enlarged portion 22 of annular shape formed on the right end thereof, as viewed in Fig. 2. The enlarged portion 22 is provided with annular grooves 23—23 in which are mounted piston rings 24—24 on which an elongated sleeve 25 is designed to slide. Piston rings 30—30 mounted in annular grooves 31—31 formed in the left end of the sleeve 25 are in contact with and may be slid along a bore 32 formed in a cylinder 33, which is mounted concentrically with respect to and is secured to the guide tube 20 by a collar 34. An annular piston 35 formed on the sleeve 25 is provided with annular grooves 40—40, which seat piston rings 41—41. The rings 41—41 are in contact with and are slidable along an enlarged bore 42 in the cylinder 33.

A fitting 43 fits snugly into the open end of the cylinder 33, and is secured therein by bolts 44—44 projecting from the right hand end of the cylinder 33. The bolts 44—44 mount a packer 45 concentrically with respect to the fitting 43, which packer is engaged by nuts 46—46 and lock washers 47—47 to compress a packing 49 against a shoulder 50 formed on the fitting 43 so that the packing fits tightly around the sleeve 25 and closes off the enlarged bore 42 from the atmosphere. Pipes 53 and 54 connect opposite ends of the enlarged bore 42 to ports 55 and 56 (Fig. 1), respectively, of a four-port, four-way valve 60 of conventional design.

A pipe 61 connected with a supply pipe 62 leading from a suitable source of air under pressure (not shown) connects the supply pipe 62 to a supply port 63 of the valve 60. A lubricator 64 is connected to the pipe 61 and supplies a lubricant to the cylinder 33 through the pipe 61.

An exhaust pipe 70 is connected with an exhaust port 71 of the valve 60, and a handle 72 controls the setting of the valve. When the handle is in the position shown in the drawing, the pipe 61 is connected to the pipe 53 so that air under pressure is supplied to the left end of the cylinder 33, as viewed in Fig. 2, and acts against the left end of the piston 35. This urges the piston and the sleeve 25 toward the right and causes a tapered, annular cap 73 positioned on the sleeve 25 to engage a gasket 76 positioned in a tapered socket 77 of an adapter 74, which has a tapered passage 75 leading from a cylindrical passage 78 thereof. When the handle 72 (Fig. 1) is thus set, the exhaust pipe 70 is connected to the pipe 54 so that air is exhausted from the right end of the cylinder 33, as viewed in Fig. 2.

When the handle 72 is turned 90° in a clockwise direction, as viewed in Fig. 1, the valve 60 is set so that the exhaust pipe 70 is connected to the pipe 53 and the pipe 61 is connected to the pipe 54. The sleeve 25 and the cap 73 then are forced rapidly away from the adapter 74 and provide an open space between the cap and the adapter so that the cover 14 may be inspected, if desired, and the conductor 13 may be spliced to another similar conductor after the entire length of the conductor 13 has been covered.

However, before the handle 72 may be turned to move the sleeve 25 away from the adapter 74, the supply of steam to the steam supply pipe 15 must be closed. The closing of the supply of steam to the pipe 15 unlocks a safety lock 80 (Fig. 3) by permitting a compression spring 84 to urge a rod 81 having pistons 82 and 83 formed thereon out of the path of the handle 72. When the steam is supplied to the steam supply pipe 15, steam is supplied by pipes 15 and 90 to an end 85 of a cylinder 86 (Fig. 3) enclosing the pistons 82 and 83. The pressure of the steam upon the piston 83 pushes the piston 83 and the rod 81 to the left, as viewed in Fig. 3, and pushes the rod into the path of the handle 72 (Fig. 1). This locks the handle against clockwise movement, as viewed in Fig. 1, and thereby prevents actuation of the valve to move the sleeve to its open position.

Pipes 92 and 93 (Fig. 3) positioned in tapped bores 94 and 95 of the cylinder 86 exhaust any steam which may leak past the piston 83 so that the pressure on the piston 83 is always greater on its right end as long as steam is supplied to the cylinder 84 than that on the left end thereof. Thus, the rod 81 is kept in its locking position as long as steam is supplied to the pipe 15. A packing 100 compressed by a plug 101 prevents the escape of steam along the plunger 81.

An exit passage 102 (Fig. 1) of the extrusion head 10 is aligned with the cylindrical passage 78 in the adapter 74, and the axes of these passages are offset upwardly from the axes of the sleeve 25, the guide tube 20 and the vulcanizing tube 12, which are axially aligned with each other. The covered conductor 13 is advanced along the axis of the exit passage 102 and is suspended between the extrusion head 10 and the left end of the vulcanizing tube 12 so that they sag slightly. However, contact of the covering with the vulcanizing tube is prevented despite the sag because the vulcanizing tube is offset downwardly from the exit passage in the extrusion head.

A drain pipe 105 drains any condensate formed from steam which may escape past the piston rings 24—24 and condense in the bore 32. A second drain pipe 106, which is normally closed by a valve 107, serves to drain any condensate formed from steam leaking past the piston rings 30—30 into the left end of the enlarged bore 42, as viewed in Fig. 2. Condensate formed from any steam which may leak past the piston rings 41—41 into the right end of the enlarged bore 42 may be drained therefrom through a drain 108 after removing a plug 109 therefrom. Thus, the bores 32 and 42 may be kept clear of any condensate of steam so that the operation of the connector 11 is not impaired by accumulations of condensate.

In the operation of the apparatus described hereinabove, the conductor 13 is advanced continuously through the extrusion head 10, which extrudes the covering 14 thereon, and the covered conductor is advanced continuously through the connector 11 and the vulcanizing tube 12. Steam is supplied to the vulcanizing tube through the pipe 15 and vulcanizes the covering 14. Steam also passes through the pipe 90 to the locking device 81 which obstructs movement of the handle 72 so that the valve 70 remains set in a position in which the pipe 61 is in communication with the pipe 53 and the exhaust pipe 70 is in communication with the pipe 54. Air under pressure bears against the left end of the piston 35, as viewed in Fig. 2, and keeps the sleeve 25 and the cap 73 in their closed positions. Any leakage of steam from the interior of the guide tube 20 past the rings 24—24 and 30—30 enters the left end of the enlarged bore 42, as viewed in Fig. 2, and augments the force of the air under pressure in maintaining the sleeve and the cap closed. The gasket 76, which is compressed between the cap and the adapter 74, effectively prevents leakage of the steam between the cap and the adapter.

When it is desired to open the sleeve 25, the steam is cut off from the pipe 15 (Fig. 1), and the conductor advancing means (not shown) and the extruder 9 are stopped. When the pressure of the steam in the vulcanizing tube falls to a safe point, the compression spring 84 (Fig. 3) will retract the rod 81 from the path of the handle 72 (Fig. 1) so that the sleeve 25 may be moved to an open position. The handle then is turned in a clockwise direction, as viewed in Fig. 1, and air under pressure is supplied to the right end of the enlarged bore 42, as viewed in Fig. 2, and the air is exhausted from the left end of that bore. The sleeve and the cap 73 then are moved quickly to the left and provide access to the portion of the covered conductor at the end of the adapter 74.

The sleeve 25 and the cap 73 may be held in their open positions until it is desired to continue the extrusion and vulcanization operation. At that time the handle 72 is moved in a counter-clockwise direction, as viewed in Fig. 1, and the sleeve and the cap are moved to their closed position almost instantaneously. Steam again is supplied to the steam supply pipe 15 and the advancing means (not shown) and the extruder 9 are restarted. The locking device 80 is actuated by the steam to lock the valve 69 against movement.

Whenever air is supplied to either the pipe 53 or the pipe 54, it carries a supply of lubricant from the lubricator 64 into the enlarged bore 42 of the cylinder 33 so that the rings 40—40, 30—30 and 24—24 are kept lubricated. This lubrication requires only the relatively infrequent replenishment of the supply of lubricant in the lubricator.

The apparatus described hereinabove provides access from all sides to the covering 14 when the sleeve 25 and the cap 73 are opened, but effectively prevents leakage of steam from the connector into the atmosphere when the sleeve and the cap are closed. The opening and closing of the connector are rapid and sure, and when it is either opened or closed it is maintained in that condition by the active force of air under pressure on the piston 40 so that there is no danger of its opening or closing accidentally.

What is claimed is:

1. In a continuous extrusion and vulcanization apparatus including an extruder and a vulcanizer, the combination of an annular cylinder having a passage extending therethrough and designed to be connected with the vulcanizer, a sleeve mounted concentrically with respect to the cylinder, an annular piston connected with the sleeve and mounted slidably in the cylinder, an adapter designed to be secured to the extruder, and means for introducing fluid under pressure into the cylinder to act against the piston and thereby press the sleeve against the adapter.

2. In a continuous extrusion and vulcanization apparatus including an extruder and a vulcanizer, the combination of a pair of telescoping elements, one of said elements having an annular chamber therein and being designed to be rigidly mounted on an end of the vulcanizer, the other element being tubular in shape and being slidably mounted in the chamber, said elements providing a passage for a covered conductor advanced from the extruder to the vulcanizer, an adapter designed to be secured to the extruder, and power-operated means for sliding the tubular element against the adapter.

3. In a continuous extrusion and vulcanization apparatus including an extruder and a vulcanizer, the combination of a cylinder having formed therein an annular chamber having one end thereof open, said cylinder being designed to be rigidly connected to the vulcanizer at a position between the vulcanizer and the extruder and also being provided with an axial passage to permit a covered conductor to be drawn from the extruder to the vulcanizer, said open end of the chamber being directed toward the extruder, an elongated tube mounted slidably in the annular chamber, an annular piston formed on the exterior of the tube, sealing means positioned between the outer wall of the annular chamber and the tube for sealing the open end of the chamber, and means for selectively introducing fluid under pressure into the chamber on either side of the annular piston, whereby the tube may be moved with respect to the cylinder.

4. In a continuous extrusion and vulcanization apparatus including an extrusion head and a vulcanizing tube, the combination of an adapter designed to be secured to the outlet of the extruding head and having a conical socket in the outer end thereof, a gasket seated in the adapter, a reciprocable tube having a conical plug on the end thereof adjacent to the adapter and designed to cooperate with the gasket and the conical socket in the adapter to form a pressure-tight joint, said reciprocable tube also being provided with an annular piston formed thereon, an annular cylinder designed to be secured to the end of the vulcanizing tube in which the reciprocable tube slides for enclosing the annular piston, piston rings mounted upon the piston to form pressure-tight joints with the vulcanizing tube and the piston, and means for introducing a fluid under pressure on either side of said piston to move the reciprocable tube either toward or away from the adapter.

KARL C. EDWARDS.
DAVID D. JONES.

REFERENCES CITED

The following references are of record in the file of this patent:

UNITED STATES PATENTS

| Number | Name | Date |
| --- | --- | --- |
| 1,745,482 | Goodwin | Feb. 4, 1930 |
| 1,788,527 | Kirley | Jan. 13, 1931 |
| 1,813,179 | Lodge | July 7, 1931 |
| 2,218,138 | Stricklen | Oct. 15, 1940 |
| 2,253,003 | Whipple | Aug. 19, 1941 |
| 2,308,062 | Drake | Jan. 12, 1943 |